(12) United States Patent
Balcells Terés et al.

(10) Patent No.: US 10,159,265 B2
(45) Date of Patent: Dec. 25, 2018

(54) FEED COMPOSITION FOR REDUCING RUMINANT METHANOGENESIS

(71) Applicant: INTERQUIM, S.A., Sant Cugat del Vallès (ES)

(72) Inventors: Joaquim Balcells Terés, Barcelona (ES); Francisco Javier Crespo Montero, Esplugues de Llobregat (ES)

(73) Assignee: INTERQUIM, S.A., Sant Cugat del Vallès (ES)

( * ) Notice: Subject to any disclaimer, the term of this patent is extended or adjusted under 35 U.S.C. 154(b) by 1004 days.

(21) Appl. No.: 14/395,327

(22) PCT Filed: Apr. 18, 2013

(86) PCT No.: PCT/EP2013/058113
§ 371 (c)(1),
(2) Date: Oct. 17, 2014

(87) PCT Pub. No.: WO2013/156574
PCT Pub. Date: Oct. 24, 2013

(65) Prior Publication Data
US 2015/0132432 A1    May 14, 2015

(30) Foreign Application Priority Data

Apr. 19, 2012 (EP) .................................. 12164765

(51) Int. Cl.
| | | |
|---|---|---|
| *A23K 20/111* | (2016.01) | |
| *A23K 20/163* | (2016.01) | |
| *A23K 1/16* | (2006.01) | |
| *A23K 20/121* | (2016.01) | |
| *A23K 50/10* | (2016.01) | |

(52) U.S. Cl.
CPC .......... *A23K 1/1618* (2013.01); *A23K 20/111* (2016.05); *A23K 20/121* (2016.05); *A23K 20/163* (2016.05); *A23K 50/10* (2016.05); *A23V 2002/00* (2013.01); *A23V 2250/00* (2013.01); *A23V 2250/21162* (2013.01); *A23V 2250/21164* (2013.01); *Y02P 60/56* (2015.11)

(58) Field of Classification Search
CPC .... A23K 20/163; A23K 50/10; A23K 20/111; A23K 20/121
See application file for complete search history.

(56) References Cited

U.S. PATENT DOCUMENTS

2010/0291239 A1* 11/2010 Serra .................... A23K 20/111
424/683

FOREIGN PATENT DOCUMENTS

EP       1132009 A1 *  9/2001  ........... A61K 36/752

OTHER PUBLICATIONS

Callaway et al. downloaded from http://www.beefresearch.org/CMDocs/BeefResearch/Safety_Project_Summaries/FY09_Orange_pulp_and_peel.pdf 5 pages, 2010.*
Han et al,"Studies on Antimicrobial Activities and Safety of Natural Naringin in Korea," Korean Journal of Mycology, Mar. 1988, abstract only.*
Gattuso et al. Molecules, 2007, vol. 12, pp. 1641-1673.*
Kamalak et al. J. Anim & Plant Sciences, 21(4), 2011, pp. 764-769.*
Hook et al. Hindawi Publishing Corp. Archaea, vol. 2010, (2010) Article ID 945785, 11 pages.*
"Technical Bulletin" downloaded from www.mi30.com, 2 pages, 2006.*
Beauchemin et al. downloaded from www.prairiesoilsandcrops.ca, pp. 17-21.*
"Cleaning cows from Inside Out" Agricultural Res. Nov./Dec. 2011, 2 pages.*
Pellati et al. Phytochem. Anal. vol. 15, pp. 220-225, 2004.*
Mandalari et al. (J Applied Microbiol. vol. 103, 2007, pp. 2056-2064.*
Mitsumori et al. Asian-Aust J Anim. Sci., vol. 21, No. 1, pp. 144-154.*
Callaway et al. Foodborne Pathogens and Disease, vol. 8, No. 10. pp. 1071-1075, 2011.*
Peterson et al. J Food Composition and Analysis, vol. 19, 2006, pp. S74-S80.*
BioflavEx® downloaded from www.furjklub.hu/bioflavexr.html, dated Jul. 17, 2008, 5 pages. (Google translation).*

* cited by examiner

*Primary Examiner* — C. Sayala
(74) *Attorney, Agent, or Firm* — Birch, Stewart, Kolasch & Birch, LLP

(57) ABSTRACT

The present invention refers to a method for reducing methane production in ruminants comprising administering to said ruminant a feed composition containing a flavanone glycoside.

21 Claims, 1 Drawing Sheet

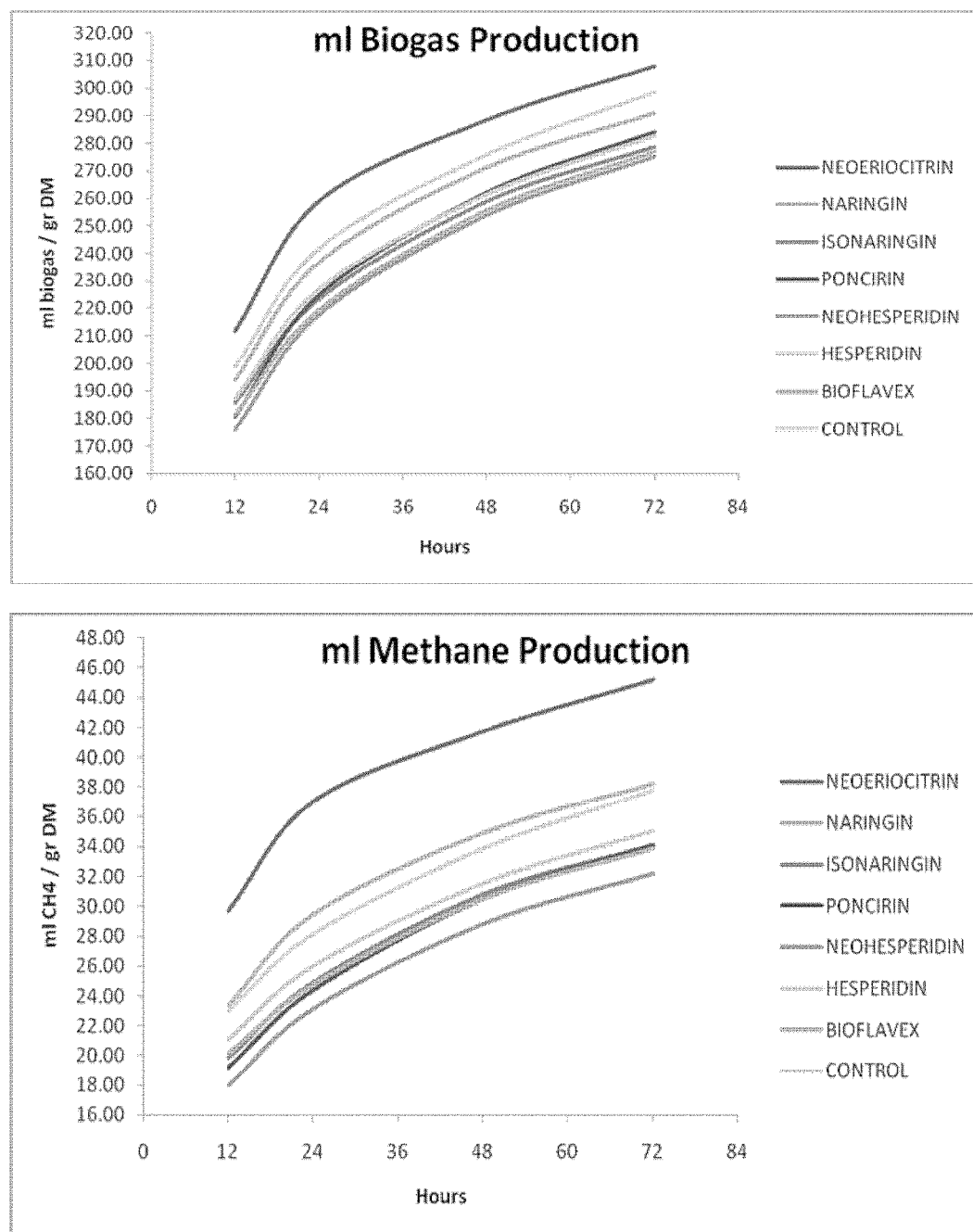

ental concentration has increased dramatically over the last century and, after carbon dioxide, is the largest potential contributor to the warming of the Earth. The increase in tropospheric methane level correlates closely with global expansion in the human population. Consequently, it is believed that approximately 70% of methane emissions are associated with human activities. Land filling of waste and agricultural practices generate and release methane to the atmosphere in amounts that will increase as the number of people in the world grows.

FEED COMPOSITION FOR REDUCING RUMINANT METHANOGENESIS

FIELD OF THE INVENTION

The present invention relates to novel compositions for the reduction of ruminant methanogenesis.

BACKGROUND OF THE INVENTION

Methane, carbon dioxide and nitrous oxide are the main gasses with greenhouse effect.

Methane ($CH_4$) is a greenhouse gas whose atmospheric concentration has increased dramatically over the last century and, after carbon dioxide, is the largest potential contributor to the warming of the Earth. The increase in tropospheric methane level correlates closely with global expansion in the human population. Consequently, it is believed that approximately 70% of methane emissions are associated with human activities. Land filling of waste and agricultural practices generate and release methane to the atmosphere in amounts that will increase as the number of people in the world grows.

Ruminants, which include cattle, buffalo, sheep, and goats, have a large fore-stomach where methane-producing fermentation occurs. The rumen digestive tract is made up of four gastric compartments, the rumen, the reticulum, the abomasum and the omasum. The largest and most important of these is the rumen. The rumen functions as a fermentation compartment. It contains large populations of microorganisms including methane producing archaea, which break down the plant material. Said microorganisms are commonly referred to as methanogens. Archaea populations use the hydrogen and carbon dioxide, products of the anaerobic microbial fermentation, to generate energy for growth, producing methane as an end product. Finally, methane is expelled out from rumen through eructation.

The production of methane by cattle and sheep represents a carbon loss pathway that reduces productivity. If the energy that is lost through methane synthesis could be rechannelled though other biochemical pathways, commonly to propionate synthesis, rumen fermentation would become more efficient and it would be reflected in the animal's weight gain or milk production improvements. It would be cost effective to the producer as well as to provide an effective tool to reduce methane emissions to the atmosphere. Indeed, because the lifespan of methane in the atmosphere is 12 years (while those of carbon dioxide and nitrous oxide are 100 years and 120 years, respectively) reducing methane emissions would have more a more rapid effect on the environment.

Past studies with ruminant animals have shown that methane production is affected by diet. By increasing the ratio structural/non-structural (cellulosic/starchy) carbohydrates, methane emissions increase. Moreover, the addition of lipids sources to the diet reduces enteric methane emissions. Although parallel to methane reduction, high fat supplementation rates reduce rumen microbial fermentation, feed intake and fibre digestibility. A number of chemical feed additives such as antibiotics, (i.e ionophores) or defaunating agents have been introduced into ruminant nutrition to promote growth, improve feed utilisation and decrease methane production. However, concerns over the presence of chemical residues in animal products and the development of bacterial resistance to antibiotics have stimulated the search for safer natural alternatives that would be useful in organic livestock farming.

Plants or plant extracts containing essential oils, tannins, saponins, flavonoids and many other plant secondary metabolites have been shown to improve rumen metabolism targeting specific groups of rumen microbial populations. Patraa A. K. and Saxenab J (2010). *Phytochemistry*, 71(11-12):1198-222 describes the use of plant secondary metabolites to inhibit methanogenesis in the rumen. Document WO2005000035 refers to a procedure to enhance ruminal fermentation and, in particular, reduce methanogenesis, consisting of the administration of a soluble alfalfa extract obtained from fresh alfalfa.

There is thus a need for alternative ruminant feed compositions comprising compounds of natural origin and which are both effective in reducing methane production and safe for its use in livestock farming.

SUMMARY OF THE INVENTION

The authors of the present invention have now found that by administering a feed composition comprising natural compounds to ruminants, methane emission are significantly reduced.

Therefore, in an aspect, the present invention refers to a method for reducing methane production in ruminants comprising administering orally to said ruminant a feed composition containing a flavanone glycoside selected from the group consisting of neohesperidin, isonaringin, poncirin, and hesperidin or a mixture thereof.

In a particular embodiment of the invention, said composition is a mixture comprising neohesperidin and poncirin. In a more particular embodiment, said mixture additionally comprises naringin. In a preferred embodiment, said mixture is a natural plant extract. In a more preferred embodiment, said plant is a citrus plant extract.

In a particular embodiment of the invention, said composition additionally comprises a carrier. In a preferred embodiment, said carrier is sepiolite.

In a particular embodiment, said composition is a mixture comprising 25 to 55% wt. of naringin, 10% to 20% wt. of neohesperidin, 1% to 5% wt. poncirin and sufficient quantity up to 100% wt. of a carrier. In a preferred embodiment, said composition comprises 40 to 50% wt. of naringin, 11 to 15% wt. of neohesperidin, 3 to 5% of poncirin and sufficient quantity up to 100% wt. of a carrier.

In a particular embodiment of the invention said ruminant is a calf, a cow, a buffalo, a sheep, a deer or a goat. In a preferred embodiment, said ruminant is a calf.

In a particular embodiment the composition of the invention is added to feed in solid form at a concentration of 50 to 1000 mg/Kg DM. In a preferred embodiment, the composition is added at a concentration of 200 to 500 mg/Kg DM.

BRIEF DESCRIPTION OF THE FIGURES

FIG. 1 represents the biogas and methane production profile. Average used doses in the "in vitro" simulation system obtained with the non-supplemented ration (control) or supplemented with different types of flavonoids.

DETAILED DESCRIPTION OF THE INVENTION

As explained above, the authors of the present invention have found that by administering to a ruminant a feed composition comprising flavonoids, in particular, flavanone glycosides, methane emissions are significantly reduced.

Therefore, in an aspect, the present invention refers to a method for reducing methane production in ruminants comprising administering orally to said ruminant a feed composition containing a flavanone glycoside selected from the group consisting of neohesperidin, isonaringin, poncirin, and hesperidin or a mixture thereof.

The term "ruminant" as used herein refers to any artiodactyl mammal of the suborder Ruminantia. Said mammals chew the cud and have a stomach of four compartments, one of which is the rumen. The group includes, among others, deer, antelopes, buffalo, cattle, sheep, camel, and goat.

The term "flavonoids" as used herein refers to a class of hydrosoluble vegetable pigments producing yellow or red/blue pigmentation in petals. The term "flavanones" refers to a type of flavonoids. Flavanones are generally glycosylated by a disaccharide at position seven to give "flavanone glycosides".

As it is shown in the examples below, the inventors have surprisingly found that methane emissions are significantly reduced by administering to ruminants a feed composition according to the present invention.

Methane production by ruminants may be measured using well known methods in the art. For example, the Sulphur Hexafloride (SF6) Tracer method is a technique that allows measuring methane from individual cows in the field, using evacuated canisters around the cow neck that continuously sample expired breath. Other methods include open circuit respiration chambers, which are sealed and climatically controlled rooms that house a single cow each, allowing the analysis of all the gases produced by the animal.

The methane emitted can also be measured by infrared spectroscopy, gas chromatography, mass spectroscopy, and tuneable laser diode techniques, enclosure techniques (e.g. respiration calorimetry) prediction equations based on fermentation balance of feed characteristics, isotopic tracer techniques, etc.

Also, methane production can be measured "in vitro". In this case, the rumen fluid is collected from the animal and incubated with an incubation medium under anaerobic conditions.

In a particular embodiment of the invention, said composition is a mixture comprising neohesperidin and poncirin. In a more particular embodiment, said mixture comprises neohesperidin, poncirin and naringin. In another particular embodiment of the invention, said mixture is in the form of a natural plant extract. In a preferred embodiment, said plant extract is a citrus plant extract, and more preferably a bitter orange plant extract, said extract containing different flavanoids, in particular, flavanones glycosides. In a preferred embodiment, said plant extract contains a mixture of neohesperidin, poncirin and naringin. As it is shown in the Examples below, said plant extract is a natural plant extract comprising about 20% wt. naringin and 40% wt. bitter orange extract (25 to 27% naringin; 11 to 13% neohesperidin and 3 to 5% poncirin). In a particular case, said natural plant extract is commercially available (Bioflavex®).

Therefore, according to the present invention, the flavanones of the composition of the present invention can be obtained from a plant, more particularly, from a citrus plant.

All the components in the composition according to the present invention are products of natural origin and easily obtainable. Also, where the composition is in the form of a mixture, said mixture is easy to handle and can be prepared according to industrial formulation procedures known to experts in the field.

The term "citrus" as used herein refers to a plant of the genus *Citrus*. Examples of said citrus plants include *Citrus maxima* (Pomelo), *Citrus medica* (Citron) *Citrus reticulate* (Mandarin orange), *Citrus aurantium* (Bitter orange), *Citrus latifolia* (Persian lime), *Citrus limon* (Lemon) *Citrus paradisi* (Grapefruit), *Citrus sinensis* (Sweet orange), *Citrus trifoliata* (Trifoliate Orange), etc.

Methods for the isolation of flavanoids from plants are well known in the state of the art. In a particular case, the bitter orange extract can be obtained from ground citrus fruits (especially *Citrus aurantium*) by ordinary methods well known by the skilled person in the art such extraction, filtration, concentration, precipitation, clarification and final drying. Extraction processes can be performed in binary alcanol/water systems, wherein the alcanol is selected from methanol, ethanol, propanol and the like. Methanol is preferably used. As an illustrative, non limitative, example, 50 g of dried bitter orange are extracted with 300 ml of methanol. The suspension is centrifuged to separate the residue and the mother liquor is vacuum concentrated to a final volume of 50 ml. The resulting liquid is allowed to stand at room temperature during five days, filtered-off to separate insoluble material, concentrated, filtered again through a diatomaceous earth bed and spray-dried.

In a particular embodiment, said flavanone can be obtained from the fruit of a citrus plant. For example, naringin is a glycosylated flavanone obtained from the peel of some citric fruits such as grapefruit (*Citrus paradise*) and bitter orange (*Citrus aurantium*). It is also found in the pulp of the fruit and in the leaves, flowers and seeds of the plant. Illustrative, non limitative, methods for the isolation of the flavonoids according to the present invention are, for example, those described in documents U.S. Pat. Nos. 2,421,063A and 2,421,062A wherein a method for the recovery of naringin from plant material is described. Also, hesperidin can be obtained according to the methods described in documents U.S. Pat. Nos. 2,442,110A, 2,348, 215A and 2,400,693A. Likewise, neohesperidin can be obtained according to the method described in document U.S. Pat. No. 3,375,242A. U.S. Pat. No. 3,375,242A describes a method for producing neohesperidin wherein naringin is reacted with isovanillin to produce neohesperidin chalcone. This chalcone is then cyclised to yield neohesperidin.

Additionally, the flavonones of the composition of the present invention can be easily obtained since they are commercially available. For example, as it is shown in the examples accompanying the present invention, isonaringin, neoeritrocin and poncirin are purchased from INDOFINE Chemical Company, Inc (USA). Also, as described above, said natural plant extract according to the present invention is commercially available (Bioflavex®).

In a particular embodiment of the invention, said composition is a mixture comprising 25 to 55% wt. of naringin, 10% to 20% wt. of neohesperidin, 1% to 5% wt. poncirin and sufficient quantity up to 100% wt. of a carrier. In a more particular embodiment, said composition comprises 40 to 50% wt. of naringin, 11 to 15% wt. of neohesperidin, 3 to 5% of poncirin and sufficient quantity up to 100% wt. of a carrier.

According to another preferred embodiment of the present invention, the composition comprises a carrier. In a particular embodiment, said carrier is sepiolite. Sepiolite is a naturally occurring clay mineral of sedimentary origin. It is a non swelling, lightweight, porous clay with a large specific surface area. Chemically, sepiolite is a hydrous magnesium silicate whose individual particles have a needle-like morphology. The high surface area and porosity of this clay accounts for its outstanding absorption capacity for liquids.

These properties make it a valuable material for a wide range of applications such as pet litters, animal feed additives, carriers, absorbents, suspending and thixotropic additives and thickeners.

According to the method of the invention, methane emissions/production is reduced in ruminants when animals are fed with a composition according to the present invention comprising flavonoids of natural origin. Feed efficiency has economic relevance in farming industry. It has been known that compounds that inhibit methanogenesis in ruminants results in a shift of rumen fermentation toward producing a more desirable fatty acids profile, increasing the proportion of propionate instead of acetate, thus rumen energetic fermentation becoming more efficient (see U.S. Pat. Nos. 3,745,221; 3,615,649; and 3,862,333). It is, therefore, a further object of the present invention to provide a method for the inhibition of methanogenesis in ruminant animals with the resulting beneficial effect on rumen microbial fermentation increasing feed utilization efficiency. As it is shown in the examples below, the compositions according to the present invention decreased the levels of methane produced and shifted volatile fatty acids production in favour of propionic acid.

Methods for the determination of volatile fatty acids are well known in the art. Typically, chromatographic methods such as HPLC or gas chromatography with flame ionization detection are used.

The manner of feeding is not restricted to any in particular, and the feed composition of the present invention may be given by top-dressing over the compound feed, or fed after the present feed composition is mixed with the compound feed. Also, the feeding amount is not restricted as long as the methanogenesis is efficiently reduced while the nutrient balance is not adversely affected.

Thus in a preferred embodiment of the invention, said composition is added to the feed in solid form. In a particular embodiment, said composition is added at a concentration of 50 to 1000 mg/Kg DM (dry matter). In a more particular embodiment, said composition is added to the feed in solid form at a concentration of 200 to 500 mg/Kg DM.

The composition according to the present invention can contain other feed ingredients such as vitamins, enzymes, mineral salts, ground cereals, protein-containing components, carbohydrate-containing components, wheat middlings and/or brans.

The shape of the feed composition according to the present invention is not restricted to any in particular and may be in any form of a conventional feed composition, such as a powder and a pellet. Also, said feed composition may be produced according to the generally employed method for producing a compound feed and a feed supplement.

In a particular embodiment of the invention said ruminant is a calf, a cow, a buffalo, a sheep, a deer, a camel or a goat. In a preferred embodiment, said ruminant is a calf.

The present invention will now be described in more detail with reference to the following Examples, which should in no way be construed to be limiting the scope of the present invention.

EXAMPLES

Materials and Methods

Two trials following an identical experimental protocol were designed to study the effect of different pure flavonoids on rumen fermentation using a simulatory "in vitro" system based on the experimental protocol described by Theodorou M K et al. (1994) *Animal* Feed Science and Technology, 48 (3), p. 185-197; Mauricio, R. M., et al. (1999) *Animal Feed Science and Technology* 79, 321-330.

Gas production was determined from a semi-automatic pressure meter, the relationship between pressure levels and the produced gas volume was previously calculated.

Rumen cannulated calves which received a mixed ration mainly composed of concentrate (90:10) were used as rumen fluid donor; feed composition is presented in Table 1. The inoculum was collected and filtered through two-layer surgical gauze and kept in thermo pots. Flavonoids (Table 2) plus 600 mg of concentrate (Table 1) and 60 mg of barley straw as the substrate were dosed by triplicate in preheated bottles (39° C.) and maintained under anaerobic conditions. Flavonoids isonaringin, neoeritrocin, poncirin were purchased from INDOFINE Chemical Company, Inc (USA). 10 ml of rumen fluid and 40 ml of incubation medium were added to the bottles (McDougall, El (1948) Studies on ruminant saliva. 1. The composition and output of sheep's saliva. *Biochem J.* 43(1) 99-109). Once the bottles were filled and the anaerobic condition was applied, the bottles were sealed and the incubation process was started in a hot water bath. Pressure readings were made at 2, 4, 6, 8, 12, 24, 36 and 48 hours. Each sample was incubated in triplicate in two sets or batches.

TABLE 1

| Chemical composition of concentrate (%) | |
|---|---|
| | Control |
| Ingredients (%): | |
| Corn | 35 |
| Barley | 25 |
| Soybean Meal (44%) | 10 |
| Sunflower Meal (30%) | 3.5 |
| Wheat Bran | 6 |
| Gluten Feed (20%) | 8 |
| Sugar Beet Pulp | 7 |
| Palm Oil | 2.5 |
| Mineral Calcium | 1.3 |
| Bi-calcium Phosphate | 0.8 |
| Salt | 0.3 |
| Vit/Min Complement | 0.4 |
| Sepiolit | 0.2 |
| Bioflavex ® (*) | 0 |
| Chemical Composition | |
| Crude Protein | 16 |
| CP (degradable) | 11 |
| NDF | 22.4 |
| Starch | 41 |
| Ash | 5.8 |
| ME, (Mcal/kg DM) | 2.9 |

CP: Crude Protein;
NDF: Neutral Detergent Fibre;
DM: Dry Matter,
ME: Metabolizable energy
(*) 20% wt. naringin; 40% wt. bitter orange extract; sepiolite up to 100% wt.

TABLE 2

Flavonoids doses (mg/Kg DM) used in the first and second experiment

| Flavonoids | Dose I | Dose II |
|---|---|---|
| Exp 1 | | |
| Naringin | 200 | 500 |
| Neohesperidin | " | " |
| Hesperidin | " | " |
| Isonaringin | " | " |
| Neoeriocitrin | " | " |
| Poncirin | " | " |
| Bioflavex | | |
| Exp 2 | | |
| Excipient (Sepiolite) | " | " |
| CBC (*) | " | " |
| Neohesperidin | " | " |
| Bioflavex | " | " |

(*) Citrus Bioflavonoids Complex

After 12 hours of incubation, one bottle (replicate) from each treatment was opened, pH was recorded and the bottle was sampled for volatile fatty acids (Jouany, J. P., 1982 Science des Aliments 2, 131-144), lactate (Taylor, K. A. C. C., 1996. Appl. Biochem. Biotechnol. Enzym. Eng. Biotechnol. 56, 49-58) and ammonia (Chaney, A. L., Marbach, E. P., 1962. Clin. Chem. 8, 130-132) analyses.

The environmental DNA was extracted using the technique proposed by Yu and Morrison (2004). Quantification of *Streptococcus bovis*, *Megasphaera elsdenii* and *Selenomonas ruminantium* DNA was done by qPCR using specific primers (Tajima, K. et al. 2001. Appl. Environ. Microb. 67, 2766-2774; Ouwerkerk, D., et al. 2002. J. Appl. Microbiol. 92, 753-758). Results were statistically analyzed using the *PROC MIXED* procedure of SAS statistical package (SAS, 2000, User's guide: Statistics, version 8 editions inst., Inc., Cary, N.C.). The least significant difference was used to compare the means. Differences between means in which $P<0.05$ were accepted as significant.

Results:

1. Gas Production:

FIG. 1, shows the kinetics of gas and methane production when the "in vitro" culture of ruminal fluid was supplemented with different types and doses of flavonoids. The profiles represent the average values for both doses. Average values for each treatment, dose and sampling time are presented in Table 3 together with the statistical analyses of the results.

Gas production levels increased exponentially with incubation time. Addition of flavonoids significantly altered biogas production ($P<0.05$) although this change did not occur homogeneously among the different flavonoids substances. Neoeriocitrin increased the gas production levels compared to the control (266.7 vs. 253.72 $P>0.05$), naringin did not change ($P>0.05$), while the rest of polyphenols reduced the average production levels ($P<0.05$). The lowest values corresponded to neohesperidin and the Bioflavex® mixture (230.7 and 233.3, respectively). Isonaringin, poncirin and hesperidin (236.6, 238 and 239.6, respectively) also reduced gas production. Inclusion levels (200 and 500 mg/kg) had a significant effect ($P<0.001$) on gas production but this effect was different according to the type of flavonoid. The more pronounced dosage effect was achieved with neohesperidin.

The effects of flavonoids substances on fermentation activity of certain archea populations which are theoretically responsible for the methane production were analyzed. FIG. 1 (b) shows methane production evolution values and Table 4 presents average values and statistical analysis.

The average methane yield was lower than the total bio-gas produced. For the control, methane yield was around 15% of total gas production. Experimental treatments modified average and cumulative methane production, but these changes were distinct among the treatments: neoeriocitrin increased ($P<0.05$) methane production level compared to the control. Methanogenic activity was not modified by inclusion of hesperidin or naringin in the culture medium ($P<0.01$). However, neohesperidin, isonaringin, poncirin and the Bioflavex mixture decreased the methane production ($P<0.05$). Neohesperidin showed the most pronounced decrease, which was also differed from hesperidin ($P<0.05$). In general, the dosage "per se" did not show significant difference except in the case of neohesperidin, wherein the methane production was more reduced by increasing the dose.

The experimental design allows determining whether the effect of flavonoids on methane reduction was derived from a general reduction in microbial activity and biogas production or contrarily flavonoid affects specifically on methanogenic (archea) populations. To this end, the statistical analysis of the methane contribution in the total gas production is shown in Table 5. The presence of flavonoids in the culture medium reduced methane contribution in the total biogas production ($P<0.05$) although, again, the aforementioned impact was heterogeneous.

The inclusion of neoeriocitrin (Table 5) significantly increased the methane proportion, but the presence of the Bioflavex and neohesperidin clearly decreased it (13.70 vs. 13.66 and 14.58 for neohesperidin, Bioflavex and the control, respectively). The rest of polyphenols numerically decreased the methanogenesic activity, although reported differences were not statistically significant. The dosage (500 vs. 200 mg/kg DM) of neoeriocitrin and Bioflavex mixture tended to depress methane production although the rest of FL-substances did not show any effect and it is reflected in a significant interaction of Dose×Type of FL-substance ($P<0.05$).

In the second trial, sepiolite (as filler) and the CBC (*Citrus* Bioflavonoids complex) were tested against a negative (without flavonoids, CONTROL) and two positive references (with flavonoids sources as neohesperidin and Bioflavex). The effect of excipient (sepiolite) was nil in the gas and methane production terms (Table 6 and 7) while the CBC moderately reduced gas production but no changes were detected on the methane production.

TABLE 3

Cumulative production (72 h) and average of the biogas in "in vitro" rumen fluid culture media supplemented with different types of flavonoids, doses and incubation times.

| Items | Flavonoids | SEM[1] | Imcubation time | | | | SEM | Doses[2] | | SEM |
|---|---|---|---|---|---|---|---|---|---|---|
| | | | 12 | 24 | 48 | 72 | | 1 | 2 | |
| Neoeriocitrin | 266.78[a] | | 211.78 | 259.11 | 288.43 | 307.80 | | 277.08 | 256.47 | |
| Naringin | 248.17[bc] | | 193.90 | 236.91 | 270.98 | 290.91 | | 251.15 | 245.19 | |

TABLE 3-continued

Cumulative production (72 h) and average of the biogas in "in vitro" rumen fluid culture media supplemented with different types of flavonoids, doses and incubation times.

| | | | | | | | | | |
|---|---|---|---|---|---|---|---|---|---|
| Isonaringin | 236.62$^{de}$ | | 185.58 | 223.38 | 258.85 | 278.66 | | 235.13 | 238.1 |
| Poncirin | 237.95$^{cde}$ | 1.87 | 180.63 | 224.90 | 262.00 | 284.28 | 2.61 | 234.43 | 241.48 | 2.65
| Neohesperidin | 230.71$^{e}$ | | 175.93 | 217.84 | 253.99 | 275.06 | | 238.13 | 223.28 |
| Hesperidin | 239.65$^{cd}$ | | 187.19 | 227.31 | 261.28 | 282.84 | | 239.91 | 239.4 |
| Bioflavex | 233.36$^{de}$ | | 181.44 | 219.64 | 255.47 | 276.89 | | 235.73 | 231.00 |
| CONTROL | 253.72$^{b}$ | 2.65 | 198.71 | 242.07 | 275.69 | 298.43 | 3.69 | | |

| | | Signification | | | | |
|---|---|---|---|---|---|---|
| Flavonoids | Hour | Doses | FxD | FxH | FxDxH | DxH |
| *** | *** | 0.0011 | *** | ns | ns | ns |

[1]SEM: standard error of the mean
[2]Doses: 0.2 g/kg DM y 0.5 g/kg DM of the substrate
*$P < 0.05$,
**$P < 0.01$,
*** $P < 0.001$ and
ns No-Significant
Means with different indices (a, b, c, d) indicate significant differences between these means ($P < 0.05$).

TABLE 4

Average and accumulated methane production (72 hours) in "in vitro" ruminal fluid culture media supplemented with different types of flavonoids (treatments), dose and incubation times.

| Items | Flavonoids | SEM[1] | Hour | | | | SEM | Doses[2] | | SEM |
|---|---|---|---|---|---|---|---|---|---|---|
| | | | 12 | 24 | 48 | 72 | | 1 | 2 | |
| Neoeriocitrin | 38.40$^{a}$ | | 29.65 | 37.03 | 41.74 | 45.18 | | 39.51 | 37.28 | |
| Naringina | 31.50$^{b}$ | | 23.38 | 29.46 | 34.93 | 38.24 | | 32.28 | 30.73 | |
| Isonaringin | 27.42$^{de}$ | | 19.84 | 24.94 | 30.81 | 34.08 | | 27.40 | 27.43 | |
| Poncirin | 27.04$^{de}$ | 0.52 | 19.19 | 24.43 | 30.50 | 34.07 | 0.66 | 26.61 | 27.47 | 0.74 |
| Neohesperidin | 25.54$^{e}$ | | 18.02 | 23.15 | 28.84 | 32.18 | | 27.63 | 23.46 | |
| Hesperidin | 28.42$^{cd}$ | | 21.08 | 26.03 | 31.54 | 35.04 | | 28.11 | 28.74 | |
| Bioflavex | 27.33$^{de}$ | | 20.17 | 24.74 | 30.53 | 33.89 | | 26.30 | 28.36 | |
| CONTROL | 30.70$^{bc}$ | 0.74 | 23.00 | 28.17 | 33.84 | 37.77 | 0.94 | | | |

| | | Signification | | | | |
|---|---|---|---|---|---|---|
| Flavonoids | Hour | Doses | FxD | FxH | FxDxH | DxH |
| *** | *** | ns | 0.001 | ns | ns | ns |

[1] SEM: standard error of the mean
[2]Doses: 0.2 g/kg DM y 0.5 g/kg DM of the substrate
*$P < 0.05$,
**$P < 0.01$,
*** $P < 0.001$ and
ns No-Significant
Means with different indices (a, b, c, d) indicate significant differences between these means ($P < 0.05$).

TABLE 5

Proportion of methane in the produced biogas in "in vitro" rumen fluid culture media supplemented with different types of flavonoids (treatments), dose and incubation times.

| Items | Flavonoids | SEM[1] | Hour | | | | SEM | Doses[2] | | SEM |
|---|---|---|---|---|---|---|---|---|---|---|
| | | | 12 | 24 | 48 | 72 | | 1 | 2 | |
| Neoeriocitrin | 16.07$^{a}$ | | 14.00 | 15.75 | 16.33 | 18.19 | | 15.96 | 16.17 | |
| Naringin | 14.86$^{b}$ | | 12.04 | 14.28 | 16.14 | 16.97 | | 14.87 | 14.85 | |
| Isonaringin | 14.48$^{bc}$ | | 10.68 | 13.56 | 16.79 | 16.89 | | 14.53 | 14.43 | |
| Poncirin | 13.86$^{cd}$ | 0.15 | 10.62 | 11.94 | 16.54 | 16.34 | 0.30 | 13.92 | 13.80 | 0.22 |
| Neohesperidin | 13.66$^{d}$ | | 10.21 | 12.34 | 15.91 | 16.20 | | 13.98 | 13.35 | |
| Hesperidin | 14.16$^{cd}$ | | 11.26 | 12.40 | 16.43 | 16.55 | | 14.05 | 14.27 | |

TABLE 5-continued

Proportion of methane in the produced biogas in "in vitro" rumen fluid culture media supplemented with different types of flavonoids (treatments), dose and incubation times.

| Bioflavex | 13.70[d] | | 11.12 | 12.13 | 16.32 | 16.03 | | 13.27 | 14.53 |
|---|---|---|---|---|---|---|---|---|---|
| CONTROL | 14.59[bc] | 0.22 | 11.58 | 12.03 | 17.11 | 17.65 | 0.42 | | |

Signification

| Flavonoids | Hour | Doses | FxD | FxH | FxDxH | DxH |
|---|---|---|---|---|---|---|
| *** | *** | 0.0385 | 0.001 | *** | ns | ns |

[1] SEM: standard error of the mean
[2] Doses: 0.2 g/kg DM y 0.5 g/kg DM of the substrate
*$P < 0.05$,
**$P < 0.01$,
*** $P < 0.001$ and
ns No-Significant
Means with different indices (a, b, c, d) indicate significant differences between these means ($P < 0.05$).

TABLE 6

Cumulative production (72 h) and average of biogas in "in vitro" rumen fluid culture media supplemented with different types of flavonoids [Treatments], doses and incubation times.

| | | | Hour | | | | | Doses[2] | | |
|---|---|---|---|---|---|---|---|---|---|---|
| Ítems | Flavonoids | SEM[1] | 12 | 24 | 48 | 72 | SEM | 1 | 2 | SEM |
| Excipient (Sepiolite) | 282.19[a] | | 222.40 | 264.81 | 306.38 | 326.17 | | 279.7 | 276.7 | |
| CBC | 278.67[b] | | 224.32 | 267.09 | 303.25 | 320.01 | | 276.8 | 280.5 | |
| Neohesperidin | 268.16[c] | 1.41 | 215.60 | 256.18 | 292.28 | 308.57 | 1.55 | 267.1 | 269.2 | 2.00 |
| Bioflavex | 262.42[c] | | 209.55 | 250.47 | 286.10 | 303.55 | | 259.3 | 265.5 | |
| CONTROL | 285.08[a] | | 225.74 | 272.58 | 312.61 | 329.40 | | | | |

Signification

| Flavonoids | Hour | Doses | FxD | FxH | FxDxH | DxH |
|---|---|---|---|---|---|---|
| *** | *** | Ns | 0.0124 | *** | ns | ns |

[1] SEM: standard error of the mean
[2] Doses: 0.2 g/kg DM y 0.5 g/kg DM of the substrate
*$P < 0.05$,
**$P < 0.01$,
*** $P < 0.001$ and
ns No-Significant
Means with different indices (a, b, c, d) indicate significant differences between these means ($P < 0.05$).

TABLE 7

Cumulative and average of Methane production (72 h) in "in vitro" rumen fluid culture media supplemented with different types of flavonoids [Treatments], doses and incubation times.

| | | | Hour | | | | | Doses[2] | | |
|---|---|---|---|---|---|---|---|---|---|---|
| Ítems | Flavonoids | SEM[1] | 12 | 24 | 48 | 72 | SEM | 1 | 2 | SEM |
| Excipient (Sepiolite) | 34.03[a] | | 25.24 | 31.53 | 38.37 | 40.99 | | 34.7 | 33.4 | |
| CBC | 34.40[a] | | 26.04 | 32.13 | 38.27 | 41.16 | | 34.6 | 34.2 | |
| Neohesperidin | 30.44[b] | 0.45 | 22.52 | 27.98 | 34.31 | 36.95 | 0.47 | 30.1 | 30.8 | 0.64 |
| Bioflavex | 30.63[b] | | 22.78 | 28.22 | 34.30 | 37.23 | | 29.8 | 31.4 | |
| CONTROL | 34.54[a] | | 25.02 | 31.99 | 39.18 | 41.97 | | | | |

Signification

| Flavonoids | Hour | Doses | FxD | FxH | FxDxH | DxH |
|---|---|---|---|---|---|---|
| *** | *** | ns | Ns | *** | ns | ns |

[1] SEM: standard error of the mean
[2] Doses: 0.2 g/kg DM y 0.5 g/kg DM of the substrate
*$P < 0.05$,
**$P < 0.01$,
*** $P < 0.001$ and
ns No-Significant
Means with different indices (a, b, c, d) indicate significant differences between these means ($P < 0.05$).

2. Characterization of Ruminal Fermentation
2.1 Concentration of VFA and Ammonia.

The average volatile fatty acids (VFA) and ammonia (N—$NH_3$) concentrations in the 'in vitro' media, with or without flavonoids (regarding to the types and doses) are presented in the Table 8. The average (μ) concentrations of both (VFA and N—$NH_3$) are shown in first respective columns following their evolutions throughout the incubation time for each flavonoid type and doses. Numerically, Bioflavex showed higher VFA averages and accumulated concentrations; however the differences did not reach statistical significance (P>0.05). Ammonia levels exceeded the threshold levels to ensure proper microbial fermentation (50 mg/L). Apparently, the neoeriocitrin (227.84 mg/L) and Bioflavex mixture (209.92 mg/L) showed the highest and lowest average values respectively.

Initial VFA concentrations [constant values recorded at t=0] increased. The increases were bigger between 0 and 12 h than values recorded between 12 and 72 h reflecting the gradual substrate fermentation during the incubation time [i.e. the increase in the average VFA concentration (mmol/L) was 2.1 mmol/hour in the first (0-12 hours) period, whereas after this period these increases were reduced to an average of 0.2 mmol/hour]. According to the buffer activity of the mineral mix, the increase in VFA concentration was not reflected in an increase in the acidity of the medium. The mean pH values were 6.81, 6.77±0.0034 y 6.73±0.0033 at 0, 12, and 72 hours, respectively. The medium stability is proven by the tight standard error of the means.

2.2 Molar Proportions of VFA

Media supplementation with carbohydrate source (mainly composed of starch; i.e. concentrate) caused a significant variation in the VFA profile which leads to an increase in propionate (20.03, 28.20 and 26.45) and butyrate (9.07, 9.88 and 10.45 at 0, 12 and 72 hours, respectively) proportions, while a decrease in acetate proportion (mol/100 mol; 62.5, 55.86 and 55.86) was observed. However, increases were not homogenous among the different flavonoid types. Propionic acid proportion in the media were improved by naringin, isonaringin, poncirin, Bioflavex mixture and neohesperidin compared to the control, while the rest did not. It should be noted that in neohesperidin, naringin and Bioflavex the response to the incubation time was also modulated significantly by doses (D×H: P<0.009). In general, a negative correlation ship between methane production (Table 5) and propionate proportion (Table 9) was observed, inclusion of neoeriocitrin increased the methane proportion, whereas the opposite was true in the case neohesperidin and Bioflavex that clearly depress methane emission (13.70 and 13.66 vs. 14.58 for neohesperidin, Bioflavex and the control, respectively) improving propionate proportion (25.7 and 25.8 vs. 24.4 (P<0.1 and 23.7 (P<0.05) for neohesperidin, Bioflavex, versus control and neoeritrocin propionate proportions, respectively).

TABLE 8

Volatile fatty acid concentration (VFA; mmol/l) and ammonia (N—NH3; mg/l) in "in vitro" ruminal fluid cultures without supplementation (control) or supplemented with different types and doses of flavonoids.

| | VFA, mmol/l | | | | N—$NH_3$, mg/l | | | |
|---|---|---|---|---|---|---|---|---|
| Items | μ | 0 | 12 | 72 | M | 0 | 12 | 72 |
| Neoeriocitrin | 35.76 | 13.78 | 39.75 | 53.75 | 227.84 | 149.99 | 186.19 | 347.34 |
| Naringina | 33.35 | 13.78 | 35.23 | 51.03 | 219.57 | 149.99 | 172.47 | 336.25 |
| Isonaringin | 34.18 | 13.78 | 36.49 | 52.26 | 212.66 | 149.99 | 165.46 | 322.53 |
| Poncirin | 34.21 | 13.78 | 36.98 | 51.87 | 209.16 | 149.99 | 159.33 | 318.15 |
| Neohesperidin | 34.60 | 13.78 | 36.97 | 53.04 | 219.18 | 149.99 | 168.38 | 339.17 |
| Hesperidin | 35.25 | 13.78 | 38.25 | 53.70 | 220.15 | 149.99 | 187.36 | 323.11 |
| Bioflavex | 36.50 | 13.78 | 41.31 | 54.41 | 209.92 | 149.99 | 172.47 | 319.31 |
| Control | 34.09 | 13.78 | 40.19 | 48.29 | 208.18 | 149.99 | 164.00 | 310.56 |
| SEM [1] | 2.19 | | | | 1.06 | | | |

| | | Signification | | | | |
|---|---|---|---|---|---|---|
| Item | Flavonoids | Hour | Doses | F x D | F x H | D x H |
| Total VFA | ns | *** | Ns | ns | Ns | Ns |
| N—$NH_3$, | ns | *** | Ns | ns | Ns | Ns |

[1] SEM: standard error of the mean
[2] Doses: 0.2 g/kg DM y 0.5 g/kg DM of the substrate
*P < 0.05,
**P < 0.01,
*** P < 0.001 and
ns No-Significant
Means with different indices (a, b, c, d) indicate significant differences between these means (P < 0.05).

TABLE 9

Molar ratio (mol/100 mol) of acetic, propionic and butyric acids and the A/P rate at different times of incubation in "in vitro" ruminal fluid cultures without supplementation (control) or supplemented with different types and doses of flavonoids.

| | % Acetate | | | | % Propionate | | | | % Butyrate | | | | A/P | | |
|---|---|---|---|---|---|---|---|---|---|---|---|---|---|---|---|
| Items | μ | 0 | 12 | 72 | M | 0 | 12 | 72 | μ | 0 | 12 | 72 | 0 | 12 | 72 |
| Neoeriocitrin | 58.15 | 62.51 | 55.73 | 56.21 | 23.73 [a] | 20.03 | 26.77 | 24.39 | 10.90 [b] | 9.07 | 11.84 | 11.79 | 3.12 | 2.09 | 2.31 |
| Naringin | 57.18 | 62.51 | 53.70 | 55.34 | 25.59 [b] | 20.03 | 30.00 | 26.75 | 9.96 [ab] | 9.07 | 10.47 | 10.33 | 3.12 | 1.79 | 2.07 |

TABLE 9-continued

Molar ratio (mol/100 mol) of acetic, propionic and butyric acids and the A/P rate at different times of incubation in "in vitro" ruminal fluid cultures without supplementation (control) or supplemented with different types and doses of flavonoids.

|  | % Acetate | | | | % Propionate | | | | % Butyrate | | | | A/P | | |
|---|---|---|---|---|---|---|---|---|---|---|---|---|---|---|---|
| Items | μ | 0 | 12 | 72 | M | 0 | 12 | 72 | μ | 0 | 12 | 72 | 0 | 12 | 72 |
| Isonaringin | 57.26 | 62.51 | 53.94 | 55.34 | 25.72 $^b$ | 20.03 | 30.20 | 26.94 | 9.87 $^{ab}$ | 9.07 | 10.31 | 10.24 | 3.12 | 1.79 | 2.06 |
| Poncirin | 57.77 | 62.51 | 55.44 | 55.36 | 25.51 $^b$ | 20.03 | 29.52 | 26.96 | 9.63 $^a$ | 9.07 | 9.61 | 10.20 | 3.12 | 1.88 | 2.05 |
| Neohesperidin | 57.62 | 62.51 | 54.68 | 55.68 | 25.66 $^b$ | 20.03 | 30.05 | 26.91 | 9.57 $^a$ | 9.07 | 9.68 | 9.96 | 3.12 | 1.82 | 2.07 |
| Hesperidin | 58.48 | 62.51 | 56.88 | 56.04 | 24.35 $^{ab}$ | 20.03 | 27.22 | 25.80 | 10.08 $^{ab}$ | 9.07 | 10.41 | 10.78 | 3.12 | 2.09 | 2.17 |
| Bioflavex | 59.12 | 62.51 | 58.22 | 56.64 | 25.78 $^b$ | 20.03 | 28.33 | 26.97 | 9.21 $^{ab}$ | 9.07 | 8.47 | 10.11 | 3.12 | 2.06 | 1.98 |
| Control | 58.27 | 62.51 | 58.35 | 53.94 | 24.43 $^{ab}$ | 20.03 | 28.32 | 27.93 | 9.20 $^a$ | 9.07 | 8.31 | 10.21 | 3.12 | 2.06 | 2.19 |
| SEM | 0.61 | 2.19 | | | 0.30 | 0.51 | | | 0.21 | 0.36 | | | 0.07 | | |

| | | | Signification | | | |
|---|---|---|---|---|---|---|
| Item | Flavonoids | Hour | Doses | F x D | F x H | D x H |
| Acetate | ns | *** | ns | Ns | Ns | 0.0263 |
| Propionate | ** | *** | ns | Ns | † | 0.0089 |
| Butyrate | ** | *** | ns | Ns | * | ns |
| Ace/Prop | * | *** | ns | Ns | Ns | 0.017 |

$^1$ SEM: standard error of the mean
* P < 0.05,
** P < 0.01,
*** P < 0.001
and ns No-Significant

2.1. Lactate Concentration and Microbial Profile.

The relationship between intraruminal lactate concentrations and acidosis dysfunction has been experimentally demonstrated. Values of lactate concentration and lactate producing (*S. bovis*) or consuming (*S. ruminantium* and *M. elsdenii*) bacteria titers obtained from the bottles incubated for 12 hours are shown in Table 10.

The effect of supplementation with different flavonoids on the lactic acid concentration was moderate and only the presence of neohesperidin, hesperidin and Bioflavex tended to moderate the recorded increase in the incubation period ([c] t=0: 22.16 mg/l). Variations in the fermentation conditions described previously (Table 8 and 9) resulted in an increase in microbial DNA concentrations, although increase did only reach statistical significance in the case of neohesperidin when titers were compared against control, neoeriocitrin, poncirin and hesperidin. The experimental treatments did not alter *S. bovis* and *S. ruminantium* titers however, according to the obtained results from the previous experiments, both neohesperidin and Bioflavex mixture improved recorded *M. elsdenii* titer compared to the recorded control values.

TABLE 10

Effect of flavonoid type in the lactic acid concentration and bacterial DNA concentration (mg/ml) determined by qPCR and relative quantification of ruminal populations of *Selenomonas ruminantium*, *Streptococcus bovis* and *Megaesphera elsdenii* at 12 hours of incubation in "in vitro" ruminal fluid culture without supplementation (control) or supplemented with different flavonoids types and doses

| | Lactate | Bacteria | Relative Quantification $2^{(\Delta\Delta Ct)}$ | | |
|---|---|---|---|---|---|
| Item | (mg/l) | DNA (μg/ml) | S. bovis | S. ruminantium | M. elsdenii |
| Neoeriocitrin | 122.5 | 13.14 $^a$ | 0.62 | 0.79 | 0.76 $^a$ |
| Naringin | 77.8 | 22.15 $^{ab}$ | 0.48 | 0.74 | 1.26 $^c$ |
| Isonaringin | 92.4 | 16.18 $^{ab}$ | 0.46 | 0.86 | 1.08 $^{ab}$ |
| Poncirin | 87.5 | 10.12 $^a$ | 0.44 | 0.68 | 0.98 $^{ab}$ |
| Neohesperidin | 45.8 | 23.93 $^{ab}$ | 0.25 | 0.53 | 1.35 $^c$ |
| Hesperidin | 44.3 | 9.18 $^a$ | 0.58 | 0.74 | 1.18 $^b$ |
| Bioflavex | 36.6 | 21.24 $^{ab}$ | 0.32 | 0.36 | 1.46 $^c$ |
| Control | 71.71 | 12.28 $^a$ | 0.74 | 0.51 | 1.08 $^{ab}$ |
| SEM | 6.76 | 3,065 | 0.11 | 0.11 | 0.24 |
| Signification | † | * | Ns | ns | * |

$^1$ SEM: standard error of the mean
* P < 0.05,
** P < 0.01,
*** P < 0.001 and
ns No-Significant
Means with different indices (a, b, c, d) indicate significant differences between these means (P < 0.05).

The invention claimed is:

1. A method for reducing methane production in a ruminant comprising:
   administering orally to said ruminant a feed composition, wherein said feed composition is a mixture comprising neohesperidin and poncirin, and wherein said ruminant exhibits reduced methane production upon oral administration of the feed composition.

2. The method according to claim 1, wherein said mixture additionally comprises naringin.

3. The method according to claim 1, wherein said mixture is a natural plant extract.

4. The method according to claim 3, wherein said natural plant extract is a citrus plant extract.

5. The method according to claim 1, wherein said feed composition additionally comprises a carrier.

6. The method according to claim 5, wherein said carrier is sepiolite.

7. The method according to claim 1, wherein said ruminant is a calf, a cow, a buffalo, a sheep, a deer, a camel or a goat.

8. The method according to claim 7, wherein said ruminant is a calf.

9. The method according to claim 1, wherein said feed composition is added to feed in solid form at a concentration of 50 to 1000 mg/Kg dry matter.

10. The method according to claim 1, wherein said feed composition is added to feed in solid form at a concentration of 200 to 500 mg/Kg dry matter.

11. The method according to claim 2, wherein said mixture is a natural plant extract.

12. The method according to claim 11, wherein said natural plant extract is a citrus plant extract.

13. The method according to claim 2, wherein said feed composition additionally comprises a carrier.

14. The method according to claim 13, wherein said carrier is sepiolite.

15. The method according to claim 2, wherein said ruminant is a calf, a cow, a buffalo, a sheep, a deer, a camel or a goat.

16. The method according to claim 15, wherein said ruminant is a calf.

17. The method according to claim 2, wherein said feed composition is added to feed in solid form at a concentration of 50 to 1000 mg/Kg dry matter.

18. The method according to claim 2, wherein said feed composition is added to feed in solid form at a concentration of 200 to 500 mg/Kg dry matter.

19. The method according to claim 2, wherein said feed composition is a mixture comprising 25 to 55% wt. of naringin, 10% to 20% wt. of neohesperidin, 1% to 5% wt. poncirin and sufficient quantity up to 100% wt. of a carrier.

20. The method according to claim 19, wherein said feed composition comprises 40 to 50% wt. of naringin, 11 to 15% wt. of neohesperidin, 3 to 5% wt. of poncirin and sufficient quantity up to 100% wt. of a carrier.

21. The method according to claim 2, wherein said feed composition is a mixture comprising 20% wt. of naringin and 40% wt. of bitter orange extract, wherein the bitter orange extract comprises 25 to 27% wt. of naringin in respect of the total amount of bitter orange extract, 11 to 13% wt. of neohesperidin in respect of the total amount of bitter orange extract, and 3 to 5% wt. of poncirin in respect of the total amount of bitter orange extract.

* * * * *